United States Patent
Dlubak

(12) 
(10) Patent No.: US 6,675,550 B1
(45) Date of Patent: Jan. 13, 2004

(54) PENETRATION RESISTANT WINDOW

(76) Inventor: Francis Charles Dlubak, 152 Baker La., Freeport, PA (US) 16229

( * ) Notice: Subject to any disclaimer, the term of this patent is extended or adjusted under 35 U.S.C. 154(b) by 519 days.

(21) Appl. No.: 09/298,640

(22) Filed: Apr. 23, 1999

Related U.S. Application Data

(63) Continuation of application No. 08/808,143, filed on Feb. 28, 1997, now Pat. No. 5,960,606.

(51) Int. Cl.[7] .............................. E06B 3/30; B32B 17/06
(52) U.S. Cl. ..................... 52/786.11; 52/208; 52/171.3; 52/204.595; 428/34; 428/426
(58) Field of Search .................... 52/786.11, 786.12, 52/208, 204.53, 204.55, 204.595, 171.3, 204.591, 204.593, 800.15; 428/34, 35, 426; 156/107, 293

(56) References Cited

U.S. PATENT DOCUMENTS

| | | |
|---|---|---|
| 2,356,878 A | 8/1944 | Painter |
| 2,392,129 A | 1/1946 | Downes |
| 2,401,552 A | 6/1946 | Cox |
| 2,406,939 A | 9/1946 | Boicey |
| 2,408,483 A | 10/1946 | Rodman |
| 2,409,808 A | 10/1946 | Sowle |
| 2,537,804 A | 1/1951 | Watkins |
| 3,023,864 A | 3/1962 | Mostoller |
| 3,061,490 A | 10/1962 | Ryan |
| 3,081,205 A | 3/1963 | Shorr |
| 3,781,184 A | 12/1973 | Domicone et al. |
| 3,881,043 A | 4/1975 | Rieser et al. |
| 4,020,217 A | 4/1977 | Karasudani et al. |
| 4,073,986 A | 2/1978 | Keslar et al. |
| 4,364,786 A | 12/1982 | Smith, Jr. et al. |
| 4,463,053 A | 7/1984 | Brinegar |
| 4,546,986 A | 10/1985 | Roselli |
| 4,594,290 A * | 6/1986 | Fischer et al. .............. 428/212 |
| 4,642,255 A | 2/1987 | Dlubak |
| 4,952,258 A * | 8/1990 | Grolig et al. ................. 156/99 |
| 4,960,631 A | 10/1990 | Walters et al. |
| 5,002,820 A | 3/1991 | Bolton et al. |
| 5,426,897 A | 6/1995 | Gazaway |
| 5,519,979 A | 5/1996 | Kunert et al. |
| 5,553,422 A | 9/1996 | Gazaway |
| 5,593,786 A | 1/1997 | Parker et al. |
| 5,778,629 A | 7/1998 | Howes |
| 5,853,828 A * | 12/1998 | Schimmelpenningh et al. ........................... 428/34 |
| 5,937,611 A * | 8/1999 | Howes .................... 52/745.15 |

OTHER PUBLICATIONS

"Glazing Solutions for Hurricane Protection. Windows: The First Line of Defense", Dupont (brochure).
Granto, "Different Approaches, Different Solutions. Manufacturers Offer a Variety of Very Different Products Designed to Meet the Codes", *U.S Glass, Metal and Glazing Magazine*, Mar. 1995).
"Wind, Rain and Wreckage", *DuPont Magazine*, pp. 19–21 (Jul./Aug. 1995).

* cited by examiner

*Primary Examiner*—Lanna Mai
*Assistant Examiner*—Winnie Yip
(74) *Attorney, Agent, or Firm*—Alan G. Towner, Esq.; Pietragallo, Bosick & Gordon

(57) ABSTRACT

A penetration resistant window includes a penetration resistant layer sandwiched between exterior and interior transparent sheets. The perimeter of the penetration resistant layer extends from the perimeters of the exterior and interior transparent sheets in a direction plane parallel with the planes of the transparent sheets. This extension allows the laminated window sheets to be mounted in a window frame such that the perimeter of the penetration resistant layer is secured within a channel in the frame, preferably by an adhesive such as silicone glue. The penetration resistant window is useful in architectural, residential and institutional applications for resisting debris penetration during hurricanes.

20 Claims, 2 Drawing Sheets

PENETRATION RESISTANT WINDOW

CROSS REFERENCE TO RELATED APPLICATION

This application is a continuation-in-part of U.S. application Ser. No. 08/808,143, filed Feb. 28, 1997 now U.S. Pat. No. 5,590,606, which is incorporated herein by reference.

FIELD OF THE INVENTION

The present invention relates to penetration resistant windows, and more particularly relates to laminated window glass which resists damage from hurricanes and the like.

BACKGROUND INFORMATION

Hurricane damage to residential and commercial buildings is a major problem, particularly in coastal regions. For example, Hurricane Andrew which hit Florida in 1992 caused tens of billions of dollars in property damage. A large amount of hurricane damage to buildings is caused by penetration of the building envelope, allowing forceful winds and weather to penetrate or enter the interior of the building. In a typical hurricane scenario, high winds initially throw debris through a building window. The wind then enters through the broken window, increasing internal air pressure within the building. The increased internal pressure places extremely high stresses on the walls and roof, typically causing the remainder of the windows to blow out and, in some cases, the roof to blow off. Hurricanes also exhibit a push-pull effect which creates an alternating pressure differential inside and outside the building.

Recognizing the importance of maintaining window integrity, stringent codes and regulations have recently been enacted in an attempt to reduce hurricane damage. For example, certain regions of Florida have enacted codes which require windows to pass a flying missile and wind load test before an occupancy certificate will be granted. During the test, windows are impacted by a 9 pound 2 by 4 board travelling at 34 mph. After impact, the windows are subjected to alternating push-pull forces comprising 9,000 inward and outward pressure cycles every 1 to 3 seconds, thereby simulating the alternating forces experienced in a hurricane. The windows must withstand penetration during this test in order to meet the code.

One solution to hurricane-induced window damage is to fit metal storm shutters over the windows. While this approach meets the above-noted code, the shutters must be installed prior to a hurricane. If a building is unattended, or if a storm is not anticipated, the metal shutters may not be installed in time to adequately prevent damage. Furthermore, shuttering of unattended buildings sends a signal to potential burglars and vandals that a building is unoccupied.

Another approach for preventing hurricane damage which meets the above-noted code is the use of window glass laminated with several co-extensive polymeric layers. The polymeric layers include a polyvinyl butyral (PVB) layer attached to the window glass, a polyester middle layer, and an abrasion resistant coating. The composite layers are sold by Dupont under the designation SentryGlas. While window glass laminated with such composite layers meets the above-noted code, the exposed inner surface of the window is relatively susceptible to cuts, abrasions and scratches. Attempts have been made to replace the co-extensive abrasion resistant coating with an inner layer of glass in order to improve abrasion resistance. However, windows incorporating such glass inner layers have not adequately prevented penetration, and have not been able to meet the above-noted code.

The present invention has been developed in view of the foregoing, and to overcome other deficiencies of the prior art.

SUMMARY OF THE INVENTION

The present invention provides a penetration resistant window including a frame defining an internal channel, exterior and interior transparent sheets, and a penetration resistant sheet between the exterior and interior transparent sheets. The penetration resistant sheet extends from the edges of the exterior and interior transparent sheets in a direction substantially parallel with the planes defined by the transparent sheets, and is secured within the internal channel of the frame.

The present invention also provides laminated window glass including an exterior glass sheet, an interior sheet, and at least one penetration resistant sheet between the exterior and interior transparent sheets. The penetration resistant sheet extends from the edges of the exterior and interior sheets in a direction substantially parallel with planes defined by the exterior and interior sheets.

The present invention will more readily understood from the following description.

DETAILED DESCRIPTION OF THE PREFERRED EMBODIMENTS

Figure 1:
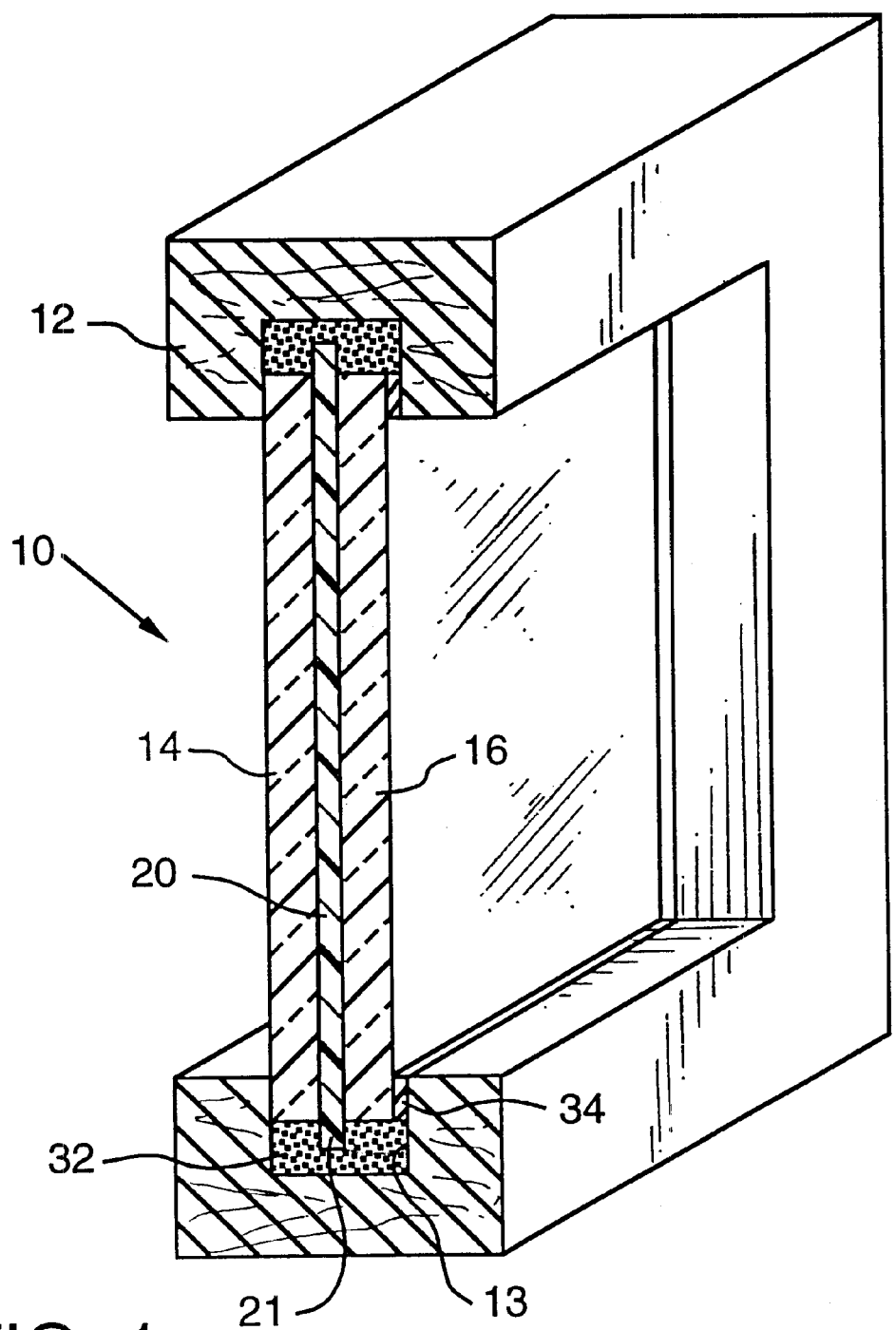
FIG. 1 is a partially schematic isometric sectional view showing a penetration resistant window in accordance with an embodiment of the present invention.

FIG. 1 schematically illustrates a penetration resistant window 10 in accordance with an embodiment of the present invention. The window 10 is preferably used in architectural, residential and institutional applications. The window 10 includes a frame 12 having an internal channel 13. The frame 12 may be made of any suitable material such as wood, metal, plastic, composites or the like. An exterior transparent sheet 14 and an interior transparent sheet 16 extend partially into the channel 13 of the frame 12. A penetration resistant sheet 20 is sandwiched between the exterior transparent sheet 14 and the interior transparent sheet 16. A perimeter or extended portion 21 of the penetration resistant sheet 20 extends beyond the edges of the exterior and interior transparent sheets 14 and 16 into the channel 13 of the frame 12. An adhesive 32 such as silicone glue or the like contacts the extended portion 21 of the penetration resistant sheet 20, thereby securing the penetration resistant sheet 20 within the channel 13 of the frame 12. A resilient gasket 34 made of foam rubber or the like is preferably positioned between the interior transparent sheet 16 and the frame 12.

As shown in FIG. 1, the extended portion 21 of the penetration resistant sheet 20 extends from the edges of the exterior and interior transparent sheets 14 and 16 in a direction substantially parallel with planes defined by the transparent sheets. The extended portion 21 preferably extends from about ⅛ to about 2 inches from the edges of the exterior and interior transparent sheets 14 and 16, more preferably from about ¼ to about 1 inch.

The exterior and interior transparent sheets 14 and 16 are preferably coextensive and have edges which define substantially the same perimeter, as illustrated in FIG. 1. The edges of the external and internal transparent sheets 14 and 16 typically extend into the internal channel 13 of the frame 12. The edges of the exterior and interior transparent sheets 14 and 16 preferably extend into the internal channel 16 from about ⅛ to about 2 inches, more preferably from about ¼ to about 1 inch.

The exterior and interior transparent sheets 14 and 16 preferably comprise window glass. The exterior and interior window glass may be of any suitable thickness, typically from about 1/16 to about 1 inch. The window glass may be made of any suitable material such as annealed, heat strengthened or tempered glass. A particularly preferred window glass comprises annealed glass having a thickness of from about ⅛ to about ⅜ inch. While the use of glass is preferred, the exterior and/or interior transparent sheets 14 and 16 may alternatively comprise other materials such as polycarbonate or other types of polymers. The exterior transparent sheet 14 preferably comprises a single layer of glass, but may alternatively include multiple layers. Similarly, the interior transparent sheet 16 preferably comprises a single layer of glass, but could alternatively include multiple layers.

The penetration resistant sheet 20 may be made of any suitable material having satisfactory penetration resistance and light transmission characteristics. Suitable penetration resistant sheets may be made of polymers such as polyvinyl butyral, polyurethane, polyester, polycarbonate, acrylic and ionoplast materials, having typical thicknesses of from about 1 to about 200 mils. Single or multiple layers may be used to form the penetration resistant sheet 20. A preferred penetration resistant sheet as illustrated in FIG. 1 is made of an ionoplast polymeric material comprising ethylene/methacrylic acid copolymers. Such sheets are commercially available from Dupont under the designation SentryGlas Plus. Another preferred penetration resistant sheet comprises multiple layers of PET commercially available from 3M under the designation Scotchshield.

An adhesive layer (not shown) may be used to mount the exterior and/or interior transparent sheets 14 and 16 on the penetration resistant sheet 20. The adhesive layer is preferably substantially co-extensive with the exterior and interior glass transparent sheets 14 and 16. Any suitable type of adhesive layer may be used, provided that it adequately secures the exterior and interior transparent sheets 14 and 16 to the penetration resistant sheet 20, and does not decrease light transmission through the window 10 to an undesirable extent. The optional adhesive layer may comprise polyurethane, PVB or silicone, with polyurethane being preferred in many applications.

Figure 2:
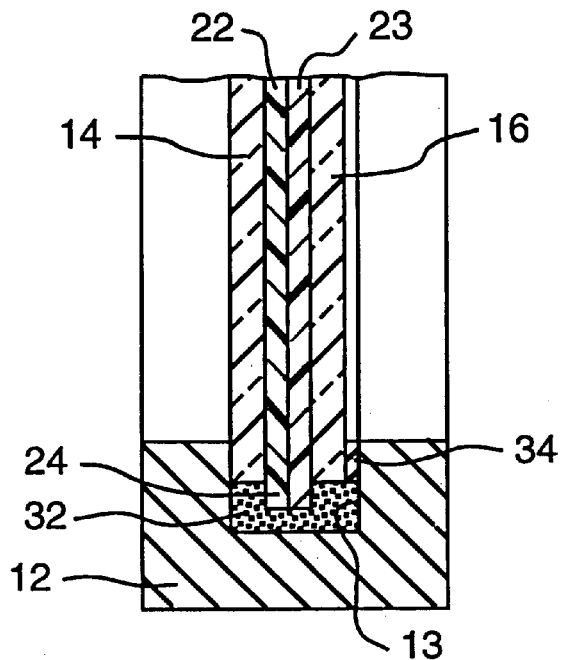
FIG. 2 is a partially schematic broken away side sectional view of a penetration resistant window in accordance with another embodiment of the present invention.

FIG. 2 is a broken away side cross-sectional view of a penetration resistant window in accordance with another embodiment of the present invention. In this embodiment, the penetration resistant sheet includes multiple polymeric layers. The first polymeric layer 22 preferably comprises polyvinyl butyral or a mix of polyvinyl butyral and other polymers such as PET, while the second polymeric layer 23 preferably comprises PET. The first layer 22 preferably has a thickness of from about 1 to about 100 mils. The second layer 23 preferably has a thickness of from about 1 to about 100 mils. In this embodiment, the interior transparent sheet 16 may be adhered by an adhesive layer (not shown) directly on the second layer 23.

Figure 3:
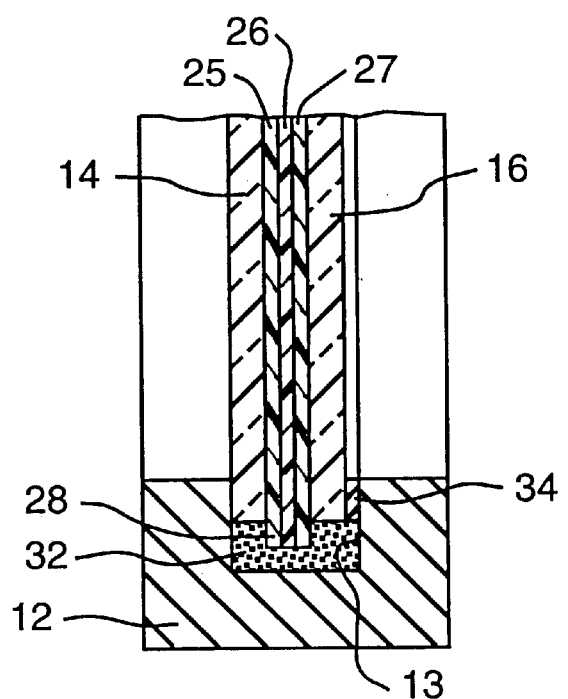
FIG. 3 is a partially schematic broken away side sectional view of a penetration resistant window in accordance with a further embodiment of the present invention.

FIG. 3 is a broken away side cross-sectional view of a penetration resistant window in accordance with a further embodiment of the present invention. In this embodiment, the penetration resistant sheet comprises multiple polymeric layers sandwiched between the exterior and interior transparent sheets 14 and 16. The first polymeric layer 25 preferably comprises PVB or a blend of PVB and other polymers such as PET, while the second polymeric layer 26 preferably comprises PET. An abrasion resistant coating 27 is provided on the PET layer 26. In this embodiment, the layers 25, 26 and 27 may form a composite laminated sheet commercially available from DuPont under the designation SentryGlas. The interior transparent sheet 16 may be adhered to the abrasion resistant coating 27 by a suitable adhesive layer (not shown) such as polyurethane.

Upon installing the windows shown in FIGS. 1–3 may be subjected to alternating inward and outward pressures typical of the pressures encountered during a hurricane. In a typical hurricane scenario, flying debris would impact the exterior transparent sheet 14 causing it to break into many pieces. The penetration resistant sheet remains intact upon impact by the flying debris. The impact of the flying debris may also fracture the interior transparent sheet 16. However, adhesive applied between the penetration resistant sheet and the interior transparent sheet 16 may secure many of the broken pieces of the interior transparent sheet 16 to the penetration resistant sheet. In this manner, upon impact by the debris, flying pieces of the interior transparent sheet 16 are reduced or eliminated. After impact, inwardly applied pressure causes the penetration resistant sheet to deform inwardly. A reversal from inward to outward pressure causes the penetration resistant sheet to deform outwardly. After repeated cycling between inward and outward pressure, the penetration resistant sheet remains substantially intact. The windows of the present invention are thus resistant to penetration when objected to forces similar to those experienced during a hurricane.

The laminated window glass of the present invention is preferably fabricated in the following manner. An exterior sheet of window glass is cleaned and a penetration resistant sheet having an extended periphery laid thereon. A sheet of adhesive material may optionally be placed under and/or over the penetration resistant sheet. An interior glass sheet having substantially the same size as the exterior sheet is then laid on the adhesive sheet such that the penetration resistant sheet extends beyond the edges of the exterior and interior glass sheets. Heat and pressure are applied to soften or at least partially liquify the penetration resistant sheet and any adhesive sheet. The resultant product comprises a laminated composite which may be installed in a window frame in accordance with the present invention.

The following examples are intended to illustrate various aspects of the present invention, and are not intended to limit the scope of the invention.

EXAMPLE 1

A sheet of laminated window glass is formed as follows. A sheet of annealed window glass having a thickness of ¼ inch, a height of 48 inches and a width of 48 inches is cleaned and laid flat. Next, a sheet of Dupont SentryGlas penetration resistant laminate is cut to a size of 49 by 49 inches. The penetration resistant laminate sheet is placed against the glass with the polyester layer on top. Next, a sheet of polyurethane having a thickness of 25 mils is cut to 48 by 48 inches and placed on top of the penetration resistant sheet. A sheet of annealed glass having a thickness of 1/8 inch is then cut to the same 48 by 48 inch size as the first glass sheet and placed on the other layers. This lay up is then placed in a film type bag and the air is vacuumed out. The bag containing the laminate is then placed into a vessel and pressurized at about 150 psi at a temperature of about 280° F. for 2.5 hours. After this process is completed, the laminated composite window glass is removed. The laminated composite window glass is then secured into a window frame channel as shown in FIG. 3 using silicone glue to adhere the extended portion of the penetration resistant sheet within the internal channel of the frame.

EXAMPLE 2

Example 1 is repeated except the sheet of Dupont SentryGlas is replaced with a sheet of Dupont SentryGlas Plus ionoplast material. The laminated composite window glass is then secured into a window frame as shown in FIG. 1 using silicone glue to adhere the extended portion of the penetration resistant sheet within the internal channel of the frame.

While particular embodiments of the present invention have been described herein, it is to be understood that various changes, additions, modifications and adaptations may be made without departing from the scope of the invention, as set forth in the following claims.

What is claimed is:

1. A penetration resistant window comprising:
   a frame defining an internal channel;
   an exterior transparent sheet;
   an interior transparent sheet;
   a penetration resistant sheet between the exterior and interior transparent sheets, extending from edges of the exterior and interior sheets in a direction substantially parallel with planes defined by the exterior and interior transparent sheets;
   wherein the edges of the exterior and interior sheets extend into the channel of the frame and are secured within the channel of the frame; and
   said penetration resistant sheet is secured within the channel of the frame.

2. The penetration resistant window of claim 1, wherein the exterior and interior transparent sheets are substantially coextensive.

3. The penetration resistant window of claim 1, wherein the edges of the exterior and interior transparent sheets define substantially the same perimeter.

4. The penetration resistant window of claim 1, wherein the edges of the exterior and interior transparent sheets extend from about 1/8 to about 2 inches into the internal channel of the frame.

5. The penetration resistant window of claim 1, wherein the penetration resistant sheet extends from the edges of the exterior and interior transparent sheets a substantially uniform distance around perimeters of the exterior and interior transparent sheets.

6. The penetration resistant window of claim 1, wherein the penetration resistant sheet extends from the edges of the exterior and interior transparent sheets a distance from about 1/8 to about 2 inches.

7. The penetration resistant window of claim 1, wherein the penetration resistant sheet extends from the edges of the exterior and interior transparent sheets a distance from about 1/4 to about 1 inch.

8. The penetration resistant window of claim 1, wherein the penetration resistant sheet is secured within the internal channel of the frame by an adhesive.

9. The penetration resistant window of claim 8, wherein the adhesive comprises silicone glue.

10. The penetration resistant window of claim 1, wherein the penetration resistant sheet comprises a single layer.

11. The penetration resistant window of claim 1, wherein the penetration resistant sheet comprises an ionoplast polymeric material.

12. The penetration resistant window of claim 11, wherein the ionoplast polymeric material comprises ethylene/methacrylic acid copolymers.

13. The penetration resistant window of claim 1, wherein the penetration resistant sheet comprises multiple layers.

14. The penetration resistant window of claim 13, wherein the penetration resistant sheet comprises a polyvinyl layer adhered to the exterior transparent sheet or the interior transparent sheet and a polyester layer adhered to the polyvinyl layer.

15. The penetration resistant window of claim 14, wherein the penetration resistant sheet further comprises an abrasion resistant coating on the polyvinyl layer.

16. The penetration resistant window of claim 1, wherein the penetration resistant sheet comprises a polyvinyl butyral layer adhered to the exterior transparent sheet having a thickness of from about 10 to about 50 mils, a PET layer adhered to the polyvinyl butyral layer having a thickness of from about 5 to about 15 mils, and an abrasion resistant coating on the PET layer.

17. The penetration resistant window of claim 1, wherein the exterior transparent sheet comprises glass.

18. The penetration resistant window of claim 1, wherein the exterior transparent sheet comprises a single layer of annealed glass having a thickness of from about 1/8 to about 3/8 inch.

19. The penetration resistant window of claim 1, wherein the interior transparent sheet comprises glass.

20. The penetration resistant window of claim 1, wherein the interior transparent sheet comprises annealed glass having a thickness of from about 1/16 to about 3/8 inch.

* * * * *

UNITED STATES PATENT AND TRADEMARK OFFICE
CERTIFICATE OF CORRECTION

PATENT NO. : 6,675,550 B1 Page 1 of 1
APPLICATION NO. : 09/298640
DATED : January 13, 2004
INVENTOR(S) : Francis Charles Dlubak It is certified that error appears in the above-identified patent and that said Letters Patent is hereby corrected as shown below:

On Title page
Item (56) References Cited
"5,853,828" should read -- 5,856,828 --

Column 1, Line 6
"application" should read -- Application --

Column 5, Line 10
"F." should read -- F -- (no period)

Signed and Sealed this

Tenth Day of April, 2007

JON W. DUDAS
*Director of the United States Patent and Trademark Office*